UNITED STATES PATENT OFFICE 2,206,249

AGENTS OF CAPILLARY ACTION FROM ALKYL-AMINO-CARBOXYLIC ACIDS WITH TERTIARY OR QUATERNARY BOUND NITROGEN

Karl Daimler, Carl Platz, and Fritz Bücking, Frankfort-on-the-Main, and Johann Rosenbach, Wiesbaden, Germany, assignors to General Aniline & Film Corporation, a corporation of Delaware No Drawing. Application June 14, 1935, Serial No. 26,700. In Germany June 22, 1934

3 Claims. (Cl. 260—534)

The present invention relates to agents of capillary action from alkyl-amino-carboxylic acids with tertiary or quaternary bound nitrogen.

We have found that agents of capillary action may be prepared from compounds of the following general formula:

wherein R means an aliphatic radical with at least 6 carbon atoms, $R_1$ and $R_2$ mean equal or different radicals which carry carboxyl groups, the position $R_3$ and Z are unoccupied or $R_3$ stands for any radical carrying, if desired a carboxyl group and Z stands for hydroxyl or another anion.

The compounds are very stable towards the salts that cause the hardness of water and have a very good washing power. Their stability towards the salts that cause the hardness of water, their wetting power and like properties are superior to those of their closely related fatty-acid-like products which are obtainable by reaction of high molecular bases with 1 mol of sodium chloracetate.

Compounds to be used for preparing the agents of capillary action, are obtainable by causing 1 mol. of a high-molecular aliphatic amine, containing an aliphatic radical of at least 6 carbon atoms (such as, for instance, dodecylamine) to react with 2 or 3 mols. of halogen-alkyl-carboxylic acid (such as, for instance, chloracetic acid, chloropropionic acid), or by causing a high-molecular alkyl chloride (for instance dodecyl chloride) to react with a suitable imino-dialkyl-dicarboxylic acid (for instance iminodiacetic acid).

Compounds falling within the scope of this invention are, for instance: hexyl-, dodecyl-, octadecyl-, octadecenyl-iminodiacetic acid, hexadecyl-beta-iminodipropionic acid, the reaction product from dodecyl-para-amino-benzoic acid and mono-chloracetic acid.

Especially good products are the compounds obtainable by treating the above mentioned bodies with alkylating agents such as, for instance, methylchloride, ethylchloride, dimethylsulfate, benzyl chloride, bromobenzene, ethylene oxide, sodium butylsulfonate or the like.

The products thus obtainable have the following general formula:

wherein R means an aliphatic radical with at least 6 carbon atoms, $R_1$ and $R_2$ mean equal or different radicals which carry carboxyl groups $R_3$ stands for an aliphatic, araliphatic or aromatic hydrocarbon radical and Z stands for hydroxyl or another anion.

Besides the above mentioned properties the new products of capillary action in comparison with soaps, have the advantage of being soluble also in an acid medium. They have amphoteric character and are, therefore, applicable to many more purposes than is soap.

The following examples serve to illustrate the invention, but they are not intended to limit it thereto, the parts being by weight:

(1.) 94.5 parts of monochloracetic acid, dissolved in 200 parts of water, are neutralized at room temperature by means of 115 parts of caustic soda solution of 35 per cent. strength; thereupon 243 parts of dodecylamino-acetic acid, dissolved in 500 parts of water by means of 115 parts of caustic soda solution of 35 per cent. strength, are added. In warming the liquid, which is at first turbid and shows a feebly alkaline reaction, becomes clear; it retains its feebly alkaline reaction. A compound is obtained which dissolves more readily than does the starting material. In the form of a solution of 2 per cent. strength, this product may be used, if necessary in the presence of sodium carbonate, as washing agent for white linen goods. Washing temperature: 70°–90° C.

(2.) 206 parts of an amine mixture called lorolamine which is obtained from the fatty acids contained in the palm nut oil by transforming the acid-mixture into the acid amides and by reducing the acid amides to the corresponding amines are caused to react for several hours at 40°–50° C. with 312 parts of chloracetic acid of 90 per cent. strength, 575 parts of caustic soda solution of 40° Bé. and 500 parts of water. A solution which contains common salt and shows an alkaline reaction is obtained; its effective substance corresponds with the following formulae

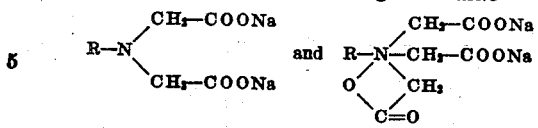

wherein R represents a mixture of aliphatic hydrocarbon radicals, containing 8-18 carbon atoms.

The product dissolves easily in acids and alkalies; it has a very good washing capacity, especially for washing white linen goods, and a considerable capacity for rendering inoffensive salts which cause the hardness of water.

(3.) 385 parts of stearyliminodiacetic acid (obtainable from stearylamine and mono-chloracetic acid) are dissolved in 300 parts of caustic soda solution of 40% strength. To this solution there are added at 60° C.–70° C. 126 parts of dimethylsulfate and the whole is stirred for 10 hours. The reaction product is rendered neutral. It has the following formula:

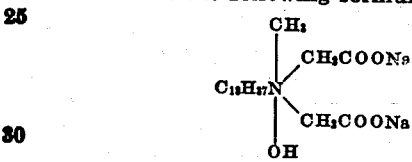

the product which is distinguished by a great stability towards lime, acids and lyes may be used in the form in which it is obtained. It is suitable for being used as levelling agent, for instance, in the dyeing with vat-dyestuffs.

(4.) A product which may be used with advantage as levelling and through-dyeing agent, for instance, in the vat dyeing or in dyeing in an acid bath may be prepared as follows:

375 parts of an iminodiacetic acid which is obtained by condensing an amine derived from hardened fish-oil with 2 molecules of mono-chloracetic acid, are stirred with 200 parts of caustic soda solution of 45.1° Bé. (41%) and 1200 parts of water. At 75° C.-85° C. there are then added, while stirring, 135 parts of dimethylsulfate and 110 parts of caustic soda solution of 45.1° Bé. (41%) in the course of 1½ hours, and the whole is stirred at the said temperature for 10 hours. The reaction product is rendered weakly alkaline to phenolphthalein.

We claim:

1. Agents of capillary action consisting of members of the group consisting of compounds of the general formula

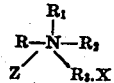

wherein R is an aliphatic hydrocarbon radical with at least 6 carbon atoms, $R_1$ and $R_2$ are hydrocarbon radicals containing carboxyl groups, $R_3$ is a hydrocarbon radical, X is a member of the group consisting of hydrogen and the carboxyl group and Z is an anion.

2. Agents of capillary action consisting of compounds of the general formula:

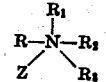

wherein R means an aliphatic hydrocarbon radical with at least 6 carbon atoms, $R_1$ and $R_2$ mean hydrocarbon radicals carrying carboxyl groups, $R_3$ stands for an aliphatic hydrocarbon radical and Z stands for an anion.

3. An agent of capillary action of the following formula

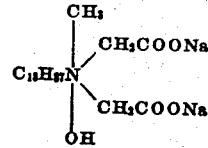

KARL DAIMLER.
CARL PLATZ.
FRITZ BÜCKING.
JOHANN ROSENBACH.